(12) United States Patent
Gibbs

(10) Patent No.: US 6,865,941 B2  
(45) Date of Patent: Mar. 15, 2005

(54) LIQUID LEAK DETECTOR

(75) Inventor: Dennis Charles Parkins Gibbs, Cheltenham (GB)

(73) Assignee: Before-The-Event, Ltd., Cheltenham (GB)

( * ) Notice: Subject to any disclaimer, the term of this patent is extended or adjusted under 35 U.S.C. 154(b) by 16 days.

(21) Appl. No.: 10/151,137

(22) Filed: May 20, 2002

(65) Prior Publication Data

US 2003/0094033 A1 May 22, 2003

(30) Foreign Application Priority Data

Nov. 21, 2001 (GB) .............................................. 0127854  
Jan. 10, 2002 (GB) .............................................. 0200441  
Apr. 24, 2002 (GB) .............................................. 0209292

(51) Int. Cl.[7] .............................................. G01M 3/16  
(52) U.S. Cl. .......................... 73/405 R; 73/40; 340/605  
(58) Field of Search .............................. 73/40, 40.5 R, 73/61.73, 64.47, 31.05; 340/605

(56) References Cited

U.S. PATENT DOCUMENTS

| | | | |
|---|---|---|---|
| 3,141,795 A | 7/1964 | Eisler | |
| 3,882,382 A | 5/1975 | Johnson | 324/65 R |
| 4,677,371 A | 6/1987 | Imaizumi | 324/52 |
| 4,677,373 A | 6/1987 | Kobayashi et al. | |
| 5,101,657 A * | 4/1992 | Lahlouh et al. | 73/40.5 R |
| 5,172,730 A * | 12/1992 | Driver | 138/104 |
| 5,177,996 A * | 1/1993 | Sahakian | 73/40 |
| 5,190,069 A * | 3/1993 | Richards | 137/312 |
| 5,203,202 A * | 4/1993 | Spencer | 73/40.5 R |
| 5,343,191 A * | 8/1994 | McAtamney | 340/605 |
| 5,357,241 A * | 10/1994 | Welch et al. | 340/605 |
| 6,101,865 A * | 8/2000 | Meixner et al. | 73/23.32 |
| 6,144,209 A * | 11/2000 | Raymond et al. | 324/512 |
| 6,175,310 B1 * | 1/2001 | Gott | 340/605 |
| 6,229,229 B1 | 5/2001 | Sharp | 307/118 |
| 6,370,945 B2 * | 4/2002 | Roberts | 73/49.5 |
| 6,526,807 B1 * | 3/2003 | Doumit et al. | 73/40.5 R |

FOREIGN PATENT DOCUMENTS

| | | |
|---|---|---|
| EP | 0278503 A2 | 8/1988 |
| EP | 0341932 A2 | 11/1989 |
| EP | 0732501 A1 | 9/1996 |
| GB | 2201219 A | 8/1988 |
| GB | 2218242 A | 11/1989 |
| GB | 2218836 A | 11/1989 |
| GB | 2235535 A | 3/1991 |
| JP | 04-134236 | 5/1992 |
| JP | 07-055622 | 3/1995 |
| JP | 07-146202 | 6/1995 |
| JP | 2002-002880 | 1/2002 |

OTHER PUBLICATIONS

Water Watcher.  
Andel Limited, The Company and the Products, E&OE, DI/Oct. 1998.  
Andel Limited, Floodline *Pad Sensor*, E&OE, DI/Oct. 1996.  
Andel Limited, Floodline Detection *Cable*, E&OE, DI/Sept. 2001.  
Andel Limited, Floodline *Junction Box* and *Caution Tags*, E&OE, DI/Sept. 2001.

* cited by examiner

*Primary Examiner*—Hezron Williams  
*Assistant Examiner*—David A. Rogers  
(74) *Attorney, Agent, or Firm*—King & Schickli, PLLC

(57) ABSTRACT

This invention relates to liquid leak detectors and detection systems. A liquid leak detector (10) includes a first electrically conducting layer (12), a second perforate, open, porous and/or permeable electrically conducting layer (13) opposed to said first layer and an intermediate perforate, open, porous and/or permeable electrically non-conducting layer (14) for electrically isolating the two conducting layers (12, 13) whilst allowing liquid, which passes through the second conductor (13), to form an electrically conducting path between the conductors (12, 13).

16 Claims, 7 Drawing Sheets

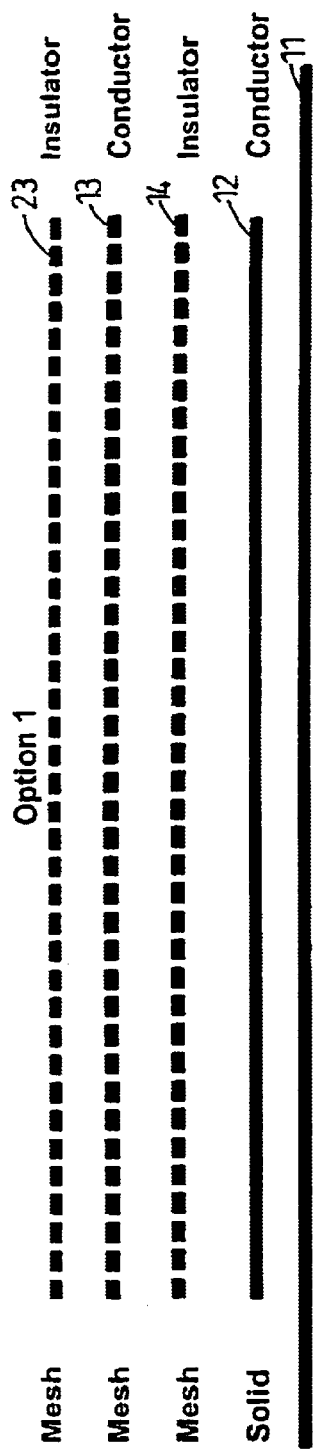
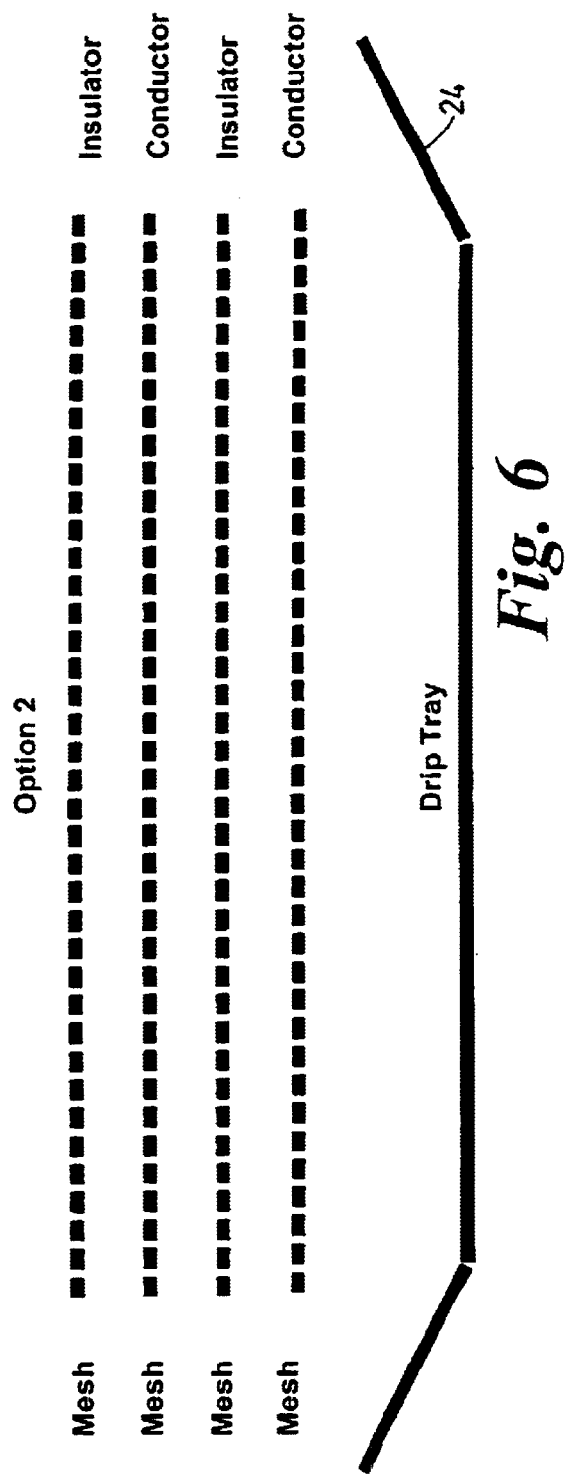
Fig. 5
Fig. 6

LIQUID LEAK DETECTOR

This invention relates to liquid leak detectors and detecting systems.

There have been many proposals for detecting leaks, particularly in domestic or warehousing situations. A great many are based on systems using a pair of spaced probes linked to an alarm such that when a circuit is made by a liquid extending between the probes, the alarm sounds. Other proposals include float operated switches. Problems can arise with these arrangements first because they tend to cover only one location in a remote space; secondly because the liquid may run away from the probe rather than towards it and thirdly because they tend only to work on or in relation to horizontal surfaces.

From one aspect the invention consists in a liquid leak detector including a first electrically conducting layer, a second perforate, open, porous and/or permeable electrical conducting layer opposed to said first layer and an intermediate perforate, open, porous and/or permeable electrically non-conducting layer for electrically isolating the two conducting layers whilst allowing liquid which passes through the second conductor to reach the first conductor to form an electrical conducting path between the two conductors.

In a preferred embodiment the first conducting layer is carried on an insulating base and indeed may be a coating or film on a surface of that base. In this configuration it is particularly preferred that the base is flexible so that the detector as a whole may be flexible and may, for example, be suitable for wrapping around pipes or the like.

In an alternative arrangement, when the pipe is metal the pipe could constitute the first conductor. In that case the intermediate layer and second conductor could conveniently be helically wound on the pipe and covered with a further insulator. It will equally be appreciated that the pipe could be considered to constitute the second conductor, in as much as once a leak starts the pipe is perforate.

From another aspect the invention also includes, a liquid leak detector for use with an electrically conducting pipe of the like comprising a perforate or open insulating layer for wrapping around the pipe and a flexible conductor for wrapping around the insulating layer.

Alternatively, the second conductor may be a sheet of metal mesh, in which case the mesh openings may be funnel shaped in cross section. Similarly, it could be a sheet of perforate metal and in that case it would be preferred that the perforations are either funnel shaped in cross section or surrounded by respective depressions. In these arrangements liquid impinging on the detector will tend to be captured by the openings or perforations and passed through the intermediate layer to the first conducting layer. This is in contrast to detectors that use planar conductors, in which the liquid would simply run along the surface of the upper conductor, if it is inclined at any angle.

The intermediate layer may be a mesh or perforate plate, or it may comprise a plurality of formations formed on the first conducting layer. In another arrangement it may be a plurality of spaced ridges. In any of these cases the intermediate layer may be physically distinct from the other layers, or it may be printed or moulded on the first conducting layer. In this case it would typically be formed from a curable polymer. In its mesh form, the intermediate layer may conveniently be made of nylon. In a still further embodiment the intermediate layer may be formed by protrusions on the insulating base that extend through the conducting layer. For example, for small detectors it may be desirable to etch spaced-apart ridge formations into a semi-conductive base, metalise the surfaces in between the ridges and then position the second conducting layer on top.

In general it will be desirable to make the intermediate layer of hydrophobic material so that the liquid will be readily passed through to the first conductor to create rapid triggering, but in some uses, particularly where the detector may be above the leak, for example in pipe wrapping, a porous intermediate layer may be preferable. For example a wadding layer could be used to wick the liquid through, but such an arrangement is likely to be less sensitive.

The invention also includes a detection system where detectors are formed for specific zones so that the location of a leak can be identified. In the pipe arrangement this can be particularly conveniently achieved by wrapping the second electrode in individual lengths and connecting a transmitter to a further conductor so that when the leak path is made by leaking liquid, the transmitter is turned on and an encoded signal is sent to an alarm station, which can identify the respective transmitter of the zone.

It is desirable to form liquid barriers between the zones and this could be done by injecting sealant through the mesh at the zone boundaries, wrapping flexible tape, e.g. PTFE tape, around the meshes at the zone boundaries so that the meshes are compressed, or encircling the meshes at the boundaries with a ring or grommet. Alternatively a ring or grommet could simply be placed on the pipe, but that would preclude the insulator mesh being wrapped as a continuous layer.

In a further alternative, which would most usually be used for a generally planar detector, the first conductor may itself be a mesh so that liquid can pass right through the detector. This introduces the possibility of a reservoir, for example a drip tray, being placed beneath the detector to capture leaking liquid so that damage does not occur, before the alarm is reacted to. This is particularly suitable for detectors placed under, for example, water tanks, dishwashers and washing machines. The tray or reservoir could be formed from aluminium, very much in the manner of a disposable cooking tray.

The invention also includes a detection system including at least one detector as defined above. In that case an alarm or indicator may be connected in series with the first and second conductors such that the electrical paths set up by the liquid completes a circuit. The flow of liquid may be used to turn on or off a suitably connected transistor An alarm may be proved for each detector so that the location of a leak can be indicated.

Although the invention has been defined above, it is to be understood that it includes any inventive combination of the features set out above or in the following description. The invention may be performed in various ways and specific embodiments will now be described, by way of example, with reference to the accompanying drawings in which:

FIG. 5 is a schematic view of a FIG. 1 type arrangement, but showing an additional mesh insulating layer;

FIG. 6 is an alternative construction of the FIG. 5 arrangement;

FIG. 11b illustrates schematically electrical connections between elements forming the ring of FIG. 11a.

Figure 1:
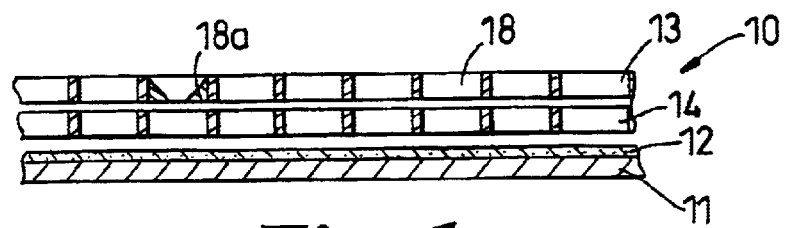
FIG. 1 is a scrap vertical section through a detector.

In FIG. 1 a detector, generally indicated at 10, includes an insulating base 11 on the upper surface of which is an electrically conducting layer 12; a conducting mesh 13 and an intermediate insulator mesh 14. In use the conducting layers 12 and 13 are connected in series with a piezoelectric sounder 15 and a battery 16 so that when impinging water creates an electrical path 17 the sound of 15 gives an alarm.

The structure shown has a number of surprising advantages. First the use of the open meshes 13 and 14 mean that any liquid, e.g. water, which impinges on the conducting layer 13 tends to be locally trapped by the mesh openings 18 and then quickly passes through the mesh 14 to the conducting layer 12 setting up an electrical path 17. In order to stop excessive wetting, which may tend to restrict the flow of water down to the lower plate, the intermediate layer 14 is preferably made with a hydrophobic material. It is particularly preferred that the openings 18 may be formed with a funnel cross section as illustrated at 18a.

Figure 2:
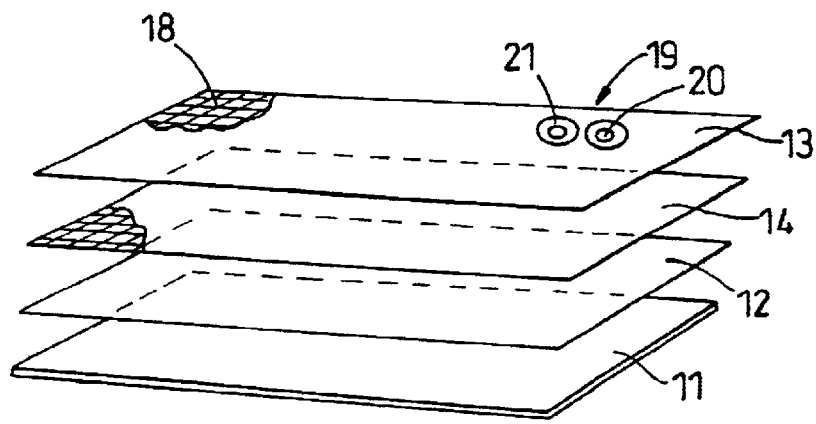
FIG. 2 is an exploded view of the detector of FIG.
Figure 3:
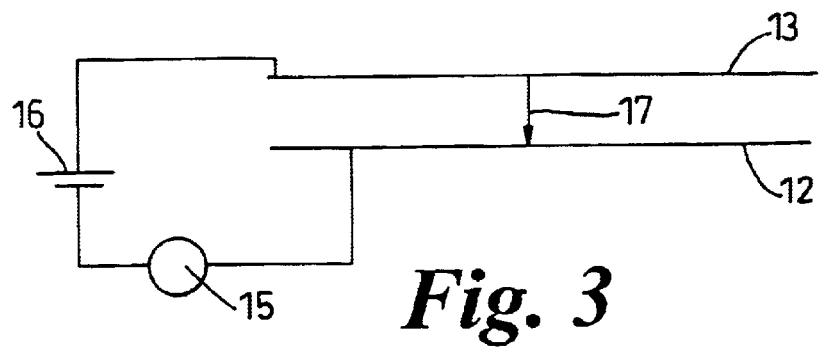
FIG. 3 is a circuit diagram of a detection system.

An alternative structure is schematically indicated in FIG. 2 at 19. Here perforations 20 have been punched in a metal plate so that surrounding depressions 21 are formed, which will again encourage water flow down through the plate 13 rather than along the surface of the plate.

As has already been described many variations on this construction may be utilised. The layer 12 may be an evaporated coating on the insulating base 15, in another embodiment, or it may be a foil layer adhered to it. The insulating base 13 may be flexible, for example it may be a neoprene type material and this would be particularly suitable if the detector was to be wrapped around a pipe, because it would also have a thermally insulating function.

Figure 4:
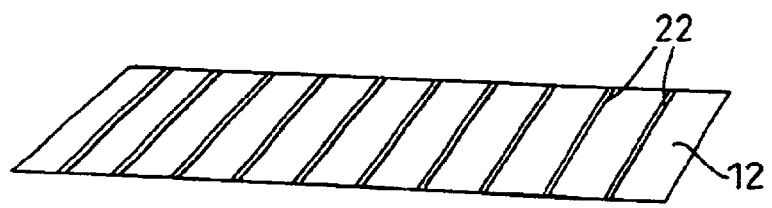
FIG. 4 illustrates a part of an alternative embodiment.

The insulating layer 14 could be formed by printing or moulding a polymer on the conducting layer 12 and need not necessarily be in the form of a mesh, but could for example, as shown in FIG. 4 be formed by a series of ridges 22.

The mesh layer 13 could be covered by a further insulating mesh layer to reduce the risk of short circuits (for example if the detector is being wrapped on a metal surface), whilst still allowing liquid flow. With the pipe wrap arrangement wherein the solid electrode is remote from the pipe surface the detector is likely to contain the leak at least for a period. Further impedance measurement techniques may be utilised to locate the position of the leak relative to a datum position. AC or DC voltage may be used.

Turning to FIG. 4, it will be seen that an additional mesh 23 is provided over the conductor 13 as will be appreciated by a person skilled in the art, this is required where the detector engages against a conducting vessel or pipe.

FIG. 6 shows substantially the same arrangement, but here the first conducting layer 12 has been rendered as a mesh so that liquid can pass right through the detector and the base plate 11 has been replaced by a spaced drip tray 24 for containing liquid to allow at least a period whilst damage will not occur after the alarm has sounded. This might be particularly useful in an automated system, in which a control module closed off valves to prevent further egress of liquid from the leak.

Figure 7:
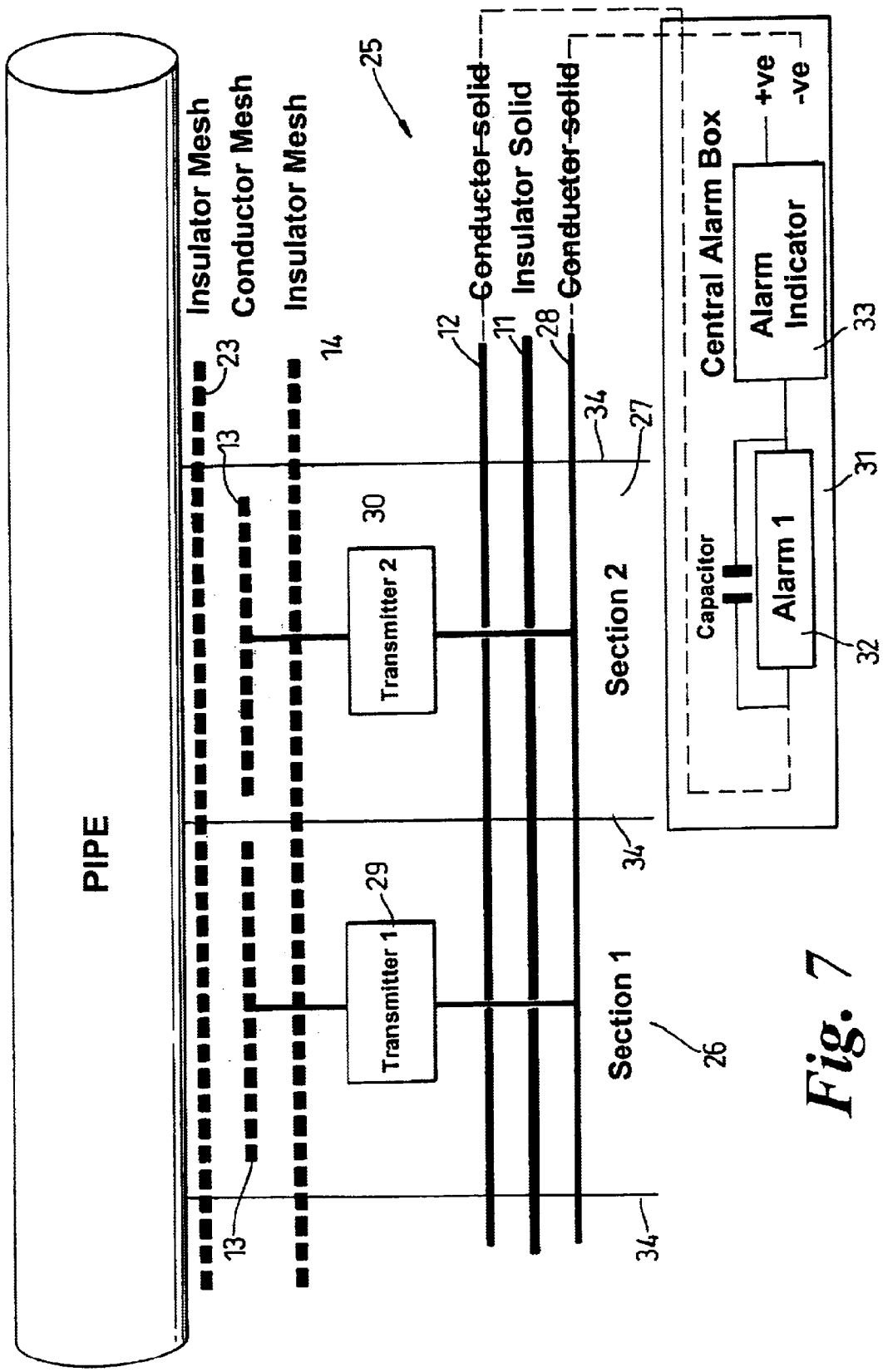
FIG. 7 is a diagrammatic view of a detection system incorporating zone detection.

Turning to FIG. 7, it will be seen that a detector system generally indicated at 25 essentially consists of a series of detection zones or sections, examples of which are shown at 26 and 27. A detector of the type generally described is formed in each section, but for convenience the insulating mesh layers 14 and 23 are continuous along the length of the pipe as is the conductor 12. The conductors 13 are, however, at least electrically confined to their respective zones and are conveniently wound as individual sections. A further conducting layer 28 is wound on the insulating sheet 11 and respective transmitters 29, 30 are connected between the conducting segments 13 and the conductor 28. The conductors 12 and 28 are connected through an alarm module 31 in such a way that when the conductors 13 and 11 are connected by a leaking liquid the transmitters 29 are turned on and feed a signal to an alarm 32 and an alarm indicator 33, whereby the alarm 32 is sounded and the indicator 33 discriminates a unique coded signal from the alarm in the leaking zone to indicate the location of the leak. Liquid barriers are preferably formed at the zone boundaries 34, for example by the mechanisms identified above or the clamps described below.

Figure 8:
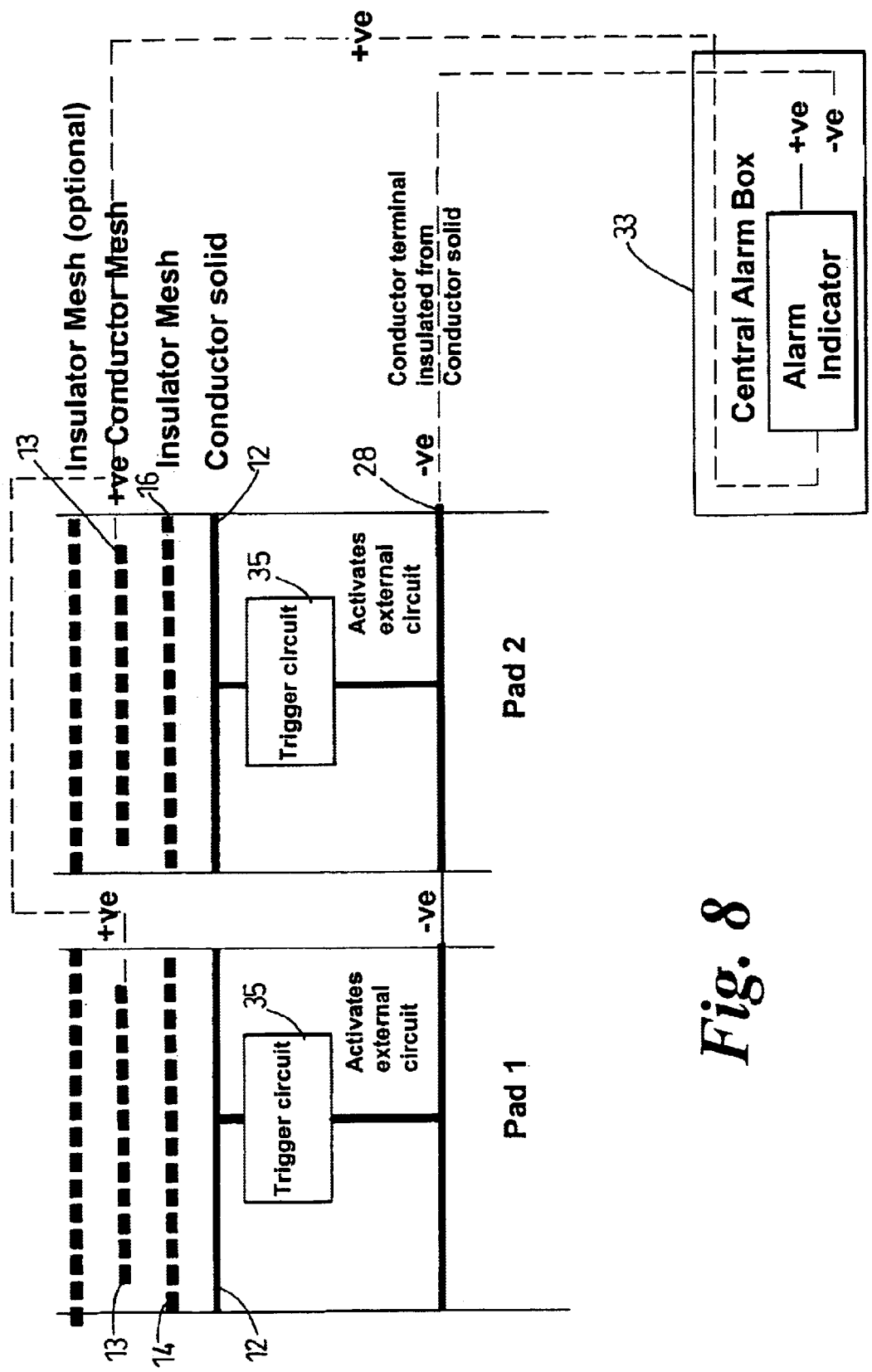
FIG. 8 is an alternative form of a detection system of FIG. 7 and is suited for forming a zone array on a generally flat surface.

FIG. 8 illustrates an alternative zone detection system in which a trigger circuit 35, for each zone is connected between an electrically floating solid conductor 12 and a negatively biased solid conductor 28. When water penetrates the insulating mesh 14 the floating conductor 12 is taken up to the positive rail voltage of conductive mesh 13. The full voltage drop causes the respective circuit 35 to trigger creating a signal at the central alarm indicator 33.

It will be noted that each zone may be in the form of a pad and the pads may form an array on a generally flat surface.

Figure 9:
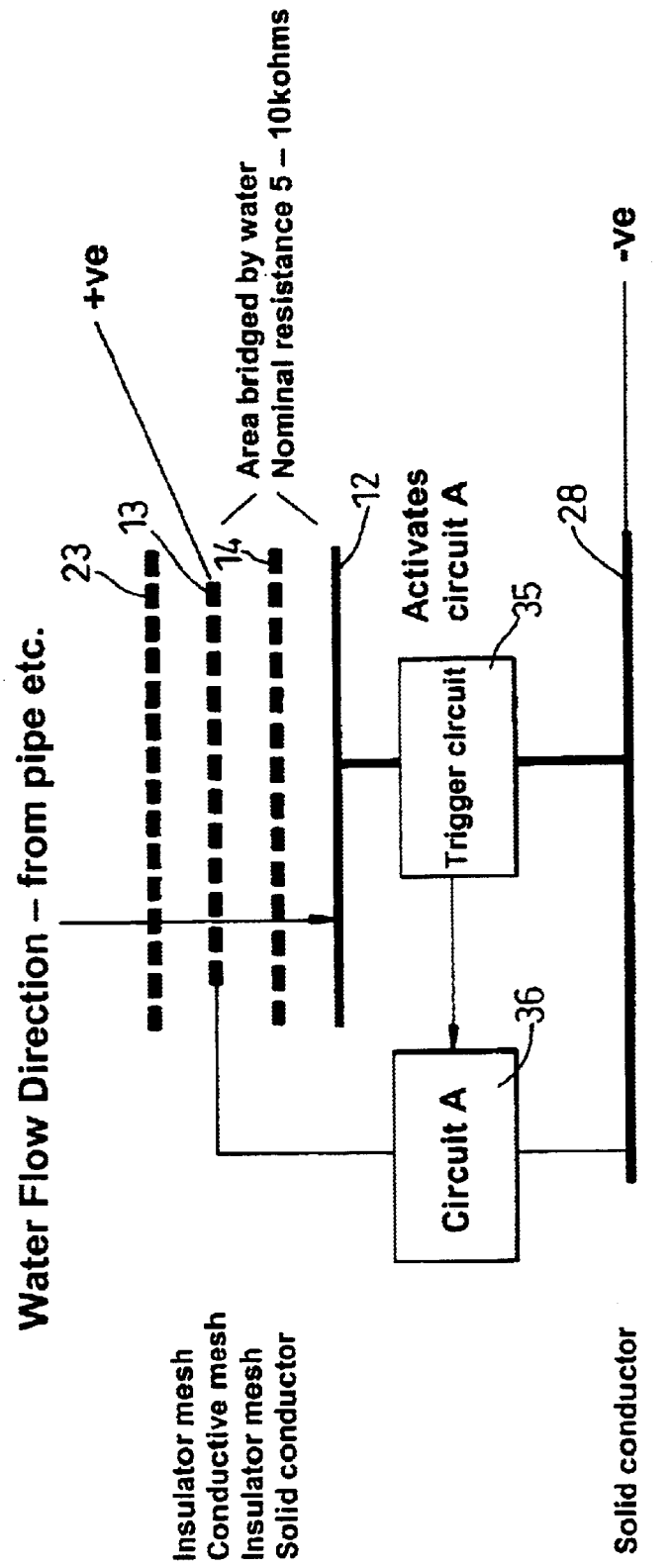
FIG. 9 illustrates an alternative zone detection system, which could also constitute a stand alone detector.

In FIG. 9 a similar circuit is shown but here the trigger circuit is used to trigger a normally inoperative circuit 36, which may, for example, generate a uniquely coded signal.

Figure 10:
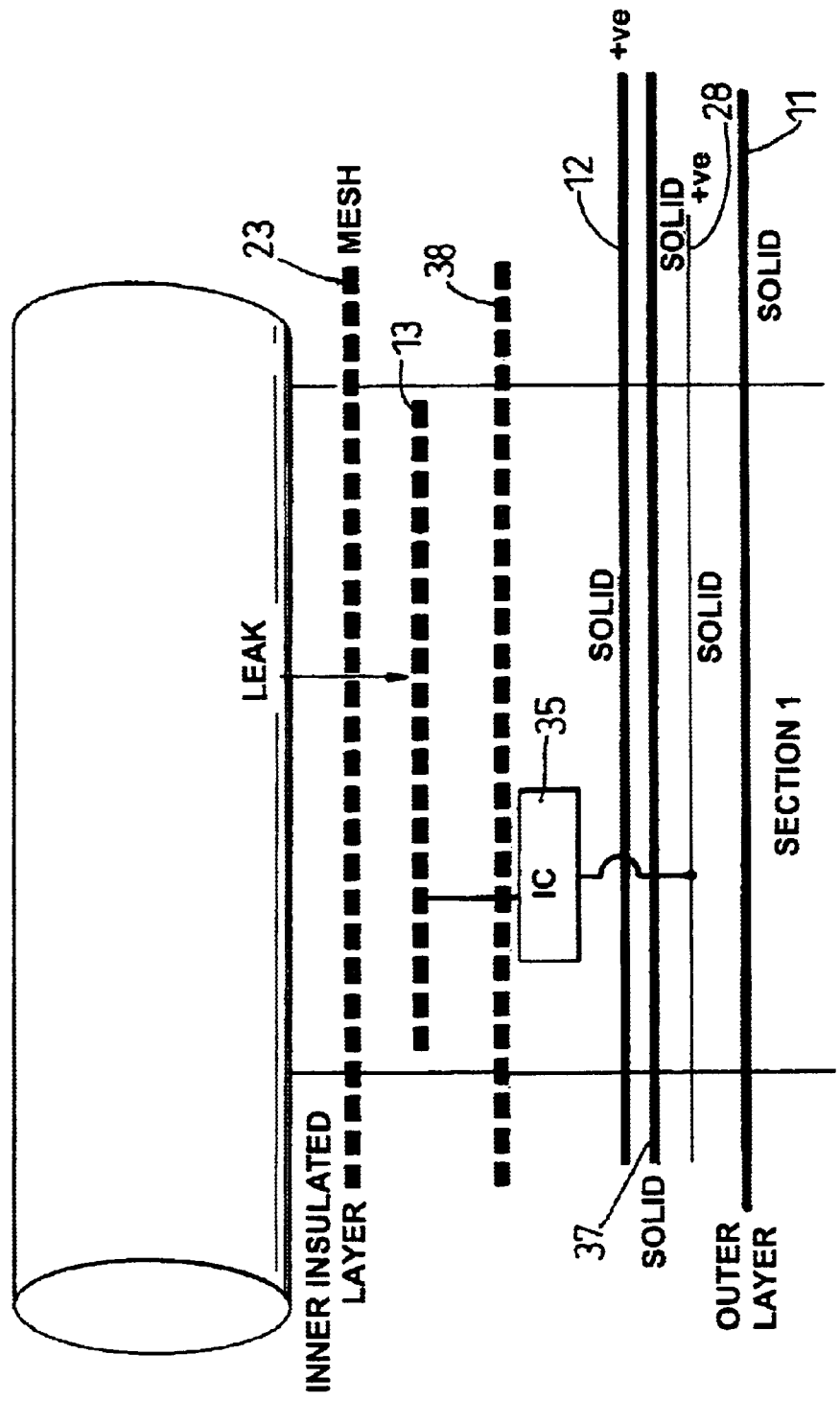
FIG. 10 illustrates yet a further zone detection system.

FIG. 10 illustrates a particular example of FIG. 8 in which an integrated circuit acts as the trigger circuit 35 and is used to generate a unique identification signal for the leaking zone, which can then set off an appropriate alarm or inform monitoring software. Here the integrated circuit is connected between an electrically floating mesh 13 and a negative conductor 28, with the solid conductor 12 being positive, so that the mesh 13 is taken up to this positive rail voltage by water extending between 13 and 12.

In addition, there is a cover mesh 23, for the conductor 13 and solid insulating outer layer 11, an insulating layer 27 between the conductors 12 and 28, and an insulating mesh layer 38 between conductors 13 and 12.

In certain situations, for example it a leak detector is placed under a shower tray, condensation may be routinely present. It would be desirable in such circumstances, to ensure that the detector was not set off by condensation and this can be achieved by increasing the path length between the conductor 13 and the conductor 11. If the path length is over a certain distance, then individual drops of water will not penetrate, but more continuous leaks will form a liquid path between the conductors causing an alarm to sound. Conveniently the increased path length can be achieved by wrapping additional mesh layers between the conductors. In the embodiments built by the applicants, a wrapping of three mesh layers has been sufficient to discriminate between condensation and a leak. Each layer of mesh is nominally 0.75 millimetres thick.

Figure 11A:
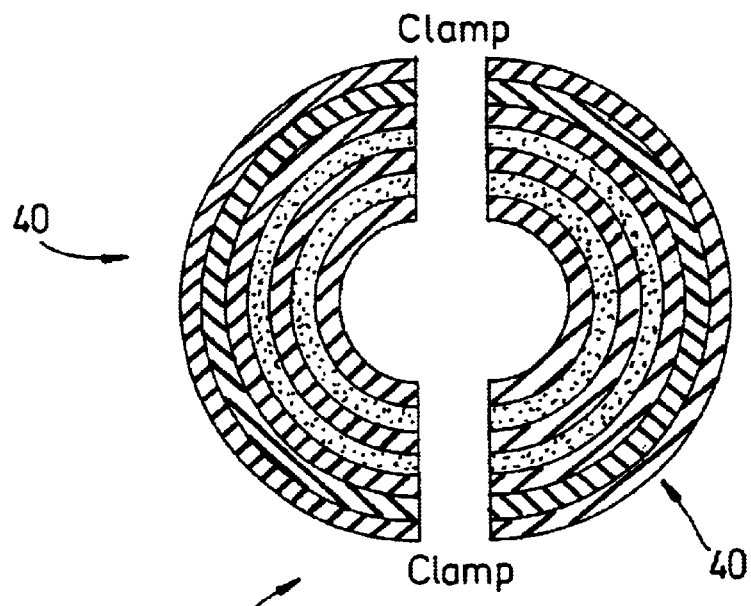
FIG. 11a illustrates a cross-section through a ring which can be clamped around a pipe to form a waterproof barrier between zones.
Figure 11B:
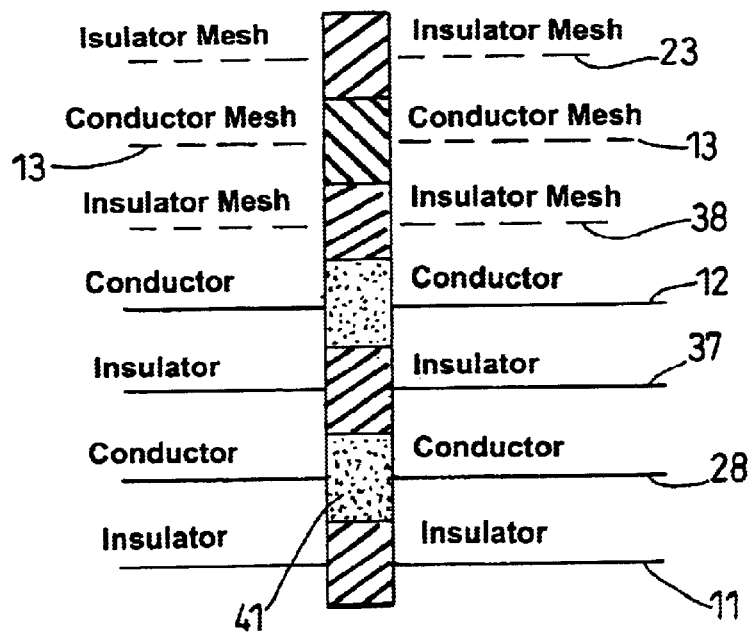

FIGS. 11(a) and (b) illustrate a two part ring 39 which can be clamped around the pipe to form the waterproof barrier between zones. At its simplest form it comprises, for example, two C-shaped rubber or plastic elements 40 clamped at their free ends around the pipe. Conveniently, however, those conductor elements, which are electrically continuous along the length the detector system 25 may be electrically connected through the elements 40 as illustrated in FIG. 11*b* at for example 41. FIG. 11 illustrates a clamp configured for use with the FIG. 10 system. The outer sheath 42, of an element 40 may contain the trigger circuit 35.

What is claimed is:

1. A liquid leak detector including a first electrically conducting layer, a second perforate, open, porous and/or permeable electrically conducting layer opposed to said first layer and an intermediate perforate, open, porous and/or permeable electrically non-conducting layer for electrically isolating the two conducting layers whilst allowing a liquid passing through the second conducting layer to reach the first conducting layer to form an electrical conducting path therebetween, wherein the second conductor is a sheet of metal mesh comprising a plurality of mesh openings each defining a funnel-shaped cross-section.

2. A detector as claimed in claim 1 wherein said first conducting layer is carried on an insulating base.

3. A detector as claimed in claim 2 wherein the first conducting layer is a coating or film on a surface of the insulating base.

4. A detector as claimed in claim 2 wherein the intermediate layer is formed by protrusions on the insulating base extending through the conducting layer.

5. A detector as claimed in claim 1 wherein the second conducting layer is a sheet of metal having a plurality of perforations therethrough.

6. A detector as claimed in claim 5 wherein at least some of said perforations are surrounded by respective depressions.

7. A detector as claimed in claim 1 wherein the intermediate layer is a mesh.

8. A detector as claimed in claim 1 wherein the intermediate layer is a perforate plate.

9. A detector as claimed in claim 1 wherein the intermediate layer comprises a plurality of formations formed on the first conducting layer.

10. A detector as claimed in claim 9 wherein the formations on said intermediate layer comprise a plurality of spaced ridges.

11. A liquid detection system including at least one detector comprising:

a first electrically conducting layer, a second perforate, open, porous and/or permeable electrically conducting layer opposed to said first layer and an intermediate perforate, open, porous and/or permeable electrically non-conducting layer for electrically isolating the two conducting layers whilst allowing a liquid passing through the second conducting layer to reach the first conducting layer to form an electrical conducting path between the first and second conducting layers; and an alarm or indicator connected in series with the first and second conducting layers such that the electrical path set up by said liquid completes a circuit, wherein said detectors are arranged in zones along a surface being monitored from which a liquid leak is to be detected, the system further including a substantially liquid-resistant barrier located between said zones;

wherein at least one conducting layer is electrically continuous through said zones.

12. A detection system as claimed in claim 11 wherein said alarm or indicator is activated by a trigger circuit connecting the first and second conducting layers which is closed when an electrical path is formed by said liquid interconnecting the first and second conducting layers.

13. A detection system comprising a plurality of detectors as claimed in claim 11, wherein each detector has a dedicated alarm or indicator.

14. A liquid leak detector including a first electrically conducting layer, a second perforate, open, porous and/or permeable electrically conducing layer opposed to said first layer and a perforate, open, porous and/or permeable electrically non-conducting intermediate layer for electrically isolating the two conducting layers whilst allowing liquid passing through the second conducting layer to reach the first conducting layer to form an electrical conducting path therebetween, wherein the second conducting layer is a sheet of metal having a plurality of perforations therethrough and wherein at least some of said perforations are surrounded by respective depressions.

15. A liquid leak detector including a first electrically conducting layer, a second perforate, open, porous and/or permeable electrically conducing layer opposed to said first layer and a perforate, open, porous and/or permeable electrically non-conducting intermediate layer for electrically isolating the two conducting layers whilst allowing liquid passing through the second conducting layer to reach the first conducting layer to form an electrical conducting path therebetween, wherein the intermediate electrically non-conducting layer comprises a plurality of spaced ridges formed on the first conducting layer.

16. A liquid leak detector including a first electrically conducting layer, a second perforate, open, porous and/or permeable electrically conducing layer opposed to said first layer and a perforate, open, porous and/or permeable electrically non-conducting intermediate layer for electrically isolating the two conducting layers whilst allowing liquid passing through the second conducting layer to reach the first conducting layer to form an electrical conducting path therebetween, wherein the first conducting layer is carried on an insulating base and the intermediate electrically non-conducting layer is formed by protrusions on the insulating base extending through the conducting layer.

* * * * *